Patented Mar. 4, 1952

2,588,318

UNITED STATES PATENT OFFICE 2,588,318

WATER EMULSIFIABLE SOIL-POISON CONCENTRATE

Paul George Benignus, Belleville, Ill., assignor to Monsanto Chemical Company, St. Louis, Mo., a corporation of Delaware No Drawing. Application February 7, 1949, Serial No. 75,095

2 Claims. (Cl. 167—43)

This invention relates to new and improved termite repellent soil-poison concentrates; more particularly this invention relates to new and improved termite repellent soil-poison concentrates having incorporated therein pentachlorophenol and trichlorobenzene as the principal active ingredients and the said concentrate being readily emulsifiable with water.

Pentachlorophenol and trichlorobenzene are well known termite repellents with pentachlorophenol being of the permanent type and trichlorobenzene being of the fumigant type. Both of these materials are widely used and recommended for the treatment of soils to render the soil resistant to termite infestation.. Pentachlorophenol is not emulsifiable with water and in fact, it is generally considered to be an emulsion breaker. While trichlorobenzene is readily emulsifiable with water, attempts to prepare a water dispersible concentrate containing both trichlorobenzene and pentachlorophenol have proven to be unsuccessful. Thus, in the past in order to prepare a soil-poison; it has been necessary to dissolve or disperse a soil-poison concentrate comprising trichlorobenzene and pentachlorophenol in organic solvents such as petroleum oil fractions. The use of these petroleum oil fractions or other organic solvents as carriers or solvents for the soil-poison concentrate has many disadvantages. First of all, it is an inconvenient method of applying the soil-poison as relatively large amounts of the organic solvent must be transported to the locale. Secondly, the use of these organic solvents creates an unnecessary expense. Thirdly, the odor, discoloration and fire hazard inherently present in such solvents renders their use exceedingly undesirable. All of these disadvantages in the use of organic solvents as the diluent, carrier, or dispersing agent for the soil-poison concentrate could be eliminated if a soil-poison concentrate could be formulated that would be readily emulsifiable in water.

It is an object of this invention to provide an improved termite repellent soil-poison concentrate.

It is a further object of this invention to provide an improved termite repellent soil-poison concentrate having incorporated therein trichlorobenzene and pentachlorophenol and being readily emulsifiable with water thereby facilitating a more convenient and economical method of soil treatment.

Further objects will become apparent from the description of the novel compositions of this invention and the claims.

It has been discovered that a readily water emulsifiable soil-poison concentrate can be prepared comprising from 25 to 45 parts by weight of a chlorinated biphenyl having a chlorine content of from 15 to 54 per cent by weight, 25 to 45 parts by weight of trichlorobenzene, 7 to 13 parts by weight of pentachlorophenol, 2.5 to 4.5 parts by weight of isopropyl alcohol, 10 to 20 parts by weight of an aromatic oil boiling between 170° F. and 570° F. such as benzene, toluene, xylene or chlorobenzene, 0.5 to 1.5 parts by weight of the non-resinous condensation product of 1 part of a substance selected from the group consisting of abietic acid, abietic anhydride, isomers of abietic acid, salts of abietic acid, esters of abietic acid, resin acids, rosin, rosin oil and tall oil with at least 0.5 part and less than 5 parts by weight of ethylene oxide, and 0.25 to 1.25 parts by weight of a surface-active agent selected from the group consisting of an aromatic oil soluble organic sulfates and sulfonates having a Draves wetting time of 10.5 seconds or less in a 0.5 per cent aqueous solution. Any omission or material deviation from the aforementioned proportional parts of the chlorinated biphenyl, aromatic oil, alcohol, emulsifying agent or surface-active agent produces a soil-poison concentrate which is exceedingly difficult if not impossible to emulsify with water.

The above mentioned non-resinous reaction products of ethylene oxide and abietic acid containing materials may be prepared by merely reacting abietic acid or compositions containing the same, with ethylene oxide in an amount such, that at least 0.5 part up to 4 to 5 parts by weight of abietic acid are condensed. The reaction may be carried out at any temperature above the melting point of the abietic acid containing material. Usually a temperature above 130° C., but below 190° C., is suitable. Generally, with any composition containing abietic acid is condensed with at least 0.5 part and up to 1.4 parts by weight of ethylene oxide per part of rosin or abietic acid, a considerable portion thereof becomes water soluble and surface-active. When greater amounts of ethylene oxide are condensed with the abietic acid containing composition, the product becomes more readily and completely water soluble. Therefore, it is desirable to use the compositions resulting from the condensation of abietic acid containing compositions and 1.4 to 5 parts by weight of ethylene oxide per part of abietic acid.

Ordinary rosin or colophony contains abietic acid or abietic anhydride in substantial amounts. Also present may be l-pimaric and d-pimaric acid. The form of abietic acid occurring in ordinary rosin may, upon treatment with acetic acid or with alkalies, be converted into Steele's abietic acid. This particular acid is unstable and readily oxidizable. It may therefore, be subjected to a disproportionation treatment to yield a product containing rosin acids known as dehydroabietic acid and dihydroabetic acid. These surface-active agents may therefore be prepared by condensing at least 0.5 part but less than 5 parts by weight of ethylene oxide per part of rosin, Steele's abietic acid, resin acid, or any of the above described forms of abietic acid, although more desirable products are obtained by condensing rosin with at least 1.4 parts but less than 5 parts by weight of ethylene oxide per part of rosin or abietic acid, as in this latter range the condensation products are completely water soluble.

The rosin-ethylene oxide product is an oily liquid. As the ethylene oxide content of the product is increased, it becomes somewhat more viscous. However, there has been no observed tendency to become semi-solid or wax-like in the higher ranges, for example, when 4 to 5 parts of ethylene oxide per part of rosin or abietic acid are employed.

Rosin oils may be selected as the abietic acid containing compositions for condensation with ethylene oxide. Rosin oils consist of a mixture of abietic acid together with terpenes resulting from the decarboxylation of abietic acid by means of heat. The so-called neutral rosin oils and the commercial grade of rosin oil known as kidney oil, containing about 56% abietic acid has been found suitable for the condensation. Compositions comprising the condensation product of rosin oil or kidney oil with at least 0.5 part but less than 5 parts by weight of ethylene oxide per part of rosin oil, are readily soluble and satisfactory for use in the novel compositions of this invention.

The desirable properties possessed by the rosin acid-ethylene oxide condensation products are also possessed by the products resulting from the condensation of mixtures of abietic acid and fatty acids such as oleic acid, linoleic acid or linolenic acid with ethlyene oxide. Tall oil is such a rosin containing mixture of fatty acids such as oleic, linoleic or linolenic acids. Tall oil by reason of the treatment of the original wood with alkali, contains abietic acid in the form of Steele's abietic acid. The reaction products of tall oil with at least 0.5 part by weight of ethylene oxide per part of tall oil possess excellent wetting and emulsifying properties.

Tall oil is obtained as a by-product in large quantities in the paper industry, wherein paper pulp is produced by the sulfate process; the major constituents of the oil comprise rosin acids, fatty acids and certain non-acid constituents, chiefly sterols and the like. The composition of tall oil is somewhat variable; however, it usually has a composition within the following limits:

|   | Per Cent |
| --- | --- |
| Fatty acids | 30–45 |
| Rosin acids | 50–55 |
| Non-acids | 8–10 |

In some cases the rosin acids or abietic acid may be crystallized or separated out of the tall oil and a fraction consisting largely of Steele's abietic acid containing smaller amounts of fatty acids than normally present in tall oil obtained. Such a fraction may contain from 0.5% to 15% or 28% of free fatty acids, the balance being abietic acid and the fraction as such may be employed for the production of the herein described wetting and emulsifying product.

The physical properties of the condensation products produced from tall oil or rosin depend upon the amount of ethylene oxide combined therewith. The tall oil-ethylene oxide product at room temperature is a readily flowing, sticky oil in the lower ranges of combined ethylene oxide, becoming more viscous as the amount of ethylene oxide is increased and finally reaching a consistency equivalent to that of a soft wax as the combined ethylene oxide reaches two parts per part of tall oil.

Although these condensation products between ethylene oxide and rosin acids may be prepared by several methods, the following examples will serve to illustrate the preparation of these emulsifying agents.

*Example I*

100 grams of N-grade rosin was melted and then heated to a temperature between 150° C. and 160° C., 0.25 gram KOH was added and ethelene oxide gas passed into the molten rosin by means of a gas distributor until 146 grams had been combined with the rosin. This corresponds to approximately 10 mols of ethylene oxide per mol of abietic acid. The product is very soluble in water, and is an efficient wetting and emulsifying agent. When Steele's abietic acid is employed in place of N-grade rosin a somewhat similar product is obtained.

*Example II*

57.6 grams of rosin oil containing 56% of rosin acids, the oil constituting the commercial product known as "kidney oil," was heated to a temperature of about 145° C. 0.25 gram of potassium hydroxide was then added and gaseous ethylene oxide was bubbled through the heated oil until 56.6 grams of ethylene oxide had been absorbed. This corresponds to 0.98 part of ethylene oxide per part rosin oil or 1.8 parts ethylene oxide per part rosin acid. The product is a perfectly water-soluble dark yellow oil, and is a satisfactory emulsifying agent for this application.

*Example III*

100 grams of crude tall oil was heated in an oil bath to a temperature of about 180° C., and 0.25 gram potassium hydroxide added. Gaseous ethylene oxide was passed into the tall oil until 200 grams of ethylene oxide had been absorbed. The product is a water soluble emulsifying agent as herein described.

The potassium hydroxide present in the example is used as a catalyst. It is to be understood that the catalyst is not essential since the reaction can be caused to proceed, though at a slower rate, without the presence of a catalyst.

Typical examples of the aromatic oil soluble organic sulfates or sulfonates having a Draves wetting time of 10.5 seconds or less in 0.5 per cent aqueous solution as mentioned above are the alkali metal salt of a mono-, di- or tri-sulfonated aromatic hydrocarbon of the benzene series, such as benzene, toluene and xylene, wherein the aromatic nucleus also contains an aliphatic side chain containing from 10 to 18 (and preferably 10 to 14) carbon atoms. These agents may be represented by the general formula:

R—Ar—(SO₃X)ₙ wherein Ar stands for an aromatic hydrocarbon radical of the benzene series, n stands for a whole number such as 1, or 2 or 3, X stands for an alkali-metal such as sodium or potassium, and R stands for an aliphatic hydrocarbon chain containing from 10 to 18 carbon atoms. Typical examples of these emulsifying agents are the alkali-metal salts of decyl-, dodecyl-, tetradecyl- or octadecylbenzene sulfonic acid, as well as the corresponding di- or tri-sulfonated product. Also mixtures of these wetting agents may be used.

Additional examples of various types of sulfonated and sulfated wetting agents having utility in the novel compositions of this invention are sulfo-succinic acid dialkyl esters, such as sodium dihexyl sulfo-succinate, sodium dioctyl sulfo-succinate, sodium didecyl sulfo-succinate, sodium didodecyl sulfo-succinate and the like; dialkyl-cyclohexylamine-dodecyl sulfate and similar products wherein the alkyl groups contain from 1 to 4 carbon atoms and the dodecyl group is replaced by alkyl groups containing from 10 to 18 carbon atoms such as dimethyl-cyclohexylamine-octadecyl sulfate, dibutyl-cyclohexylamine decyl sulfate and the like; alkylated biphenyl sodium mono-sulfonates such as monobutyl-, monoamyl- or mono-octyl-biphenyl sodium monosulfonate; dialkylated phenyl phenol sodium disulfonates such as dibutyl phenyl phenol sodium disulfonate, diamyl phenyl phenol sodium disulfonate, dihexyl phenyl phenol sodium disulfonate; butyl naphthalene sodium monosulfonate, isopropyl naphthalene sodium monosulfonate, decyl or dodecyl sodium sulfate and the like. All of the foregoing products are sulfonates or sulfates, soluble in the oil used in making our herein described concentrate and are effective wetting agents as demonstrated by their ability to give a Draves wetting time of 10.5 seconds or less in an aqueous solution containing 0.5% by weight of the wetting agent. The method of determining this Draves wetting time or sinking time is described in the 1944 Yearbook of American Association of Textiles Chemists and Colorists, Volume XXI, page 199.

The hereinbefore mentioned soil-poison concentrate is simple to prepare. The most convenient method of preparation is as follows:

The ethylene oxide and abietic acid containing material condensation product and the aromatic oil soluble organic sulfate or sulfonate are intimately mixed. The aromatic oil and the isopropyl alcohol are then added with stirring until solution is complete. The chlorinated biphenyl and trichlorobenzene are mixed in a separate container and warmed from 55 to 60° C. The pentachlorophenol is then added to this mixture and stirred until dissolved. The two solutions are then mixed and the soil-poison concentrate is ready for use. This preferred method of preparation does not involve a fire hazard as only the relatively non-flammable materials are heated. An alternative method of preparation may be carried out by adding the aromatic oil and isopropyl alcohol to the emulsifying agents, then adding the trichlorobenzene, chlorinated biphenyl and pentachlorophenol while heating to about 50° C. with continuous agitation. The concentrate is a sparkling clear solution. However, on long standing a slight amount of sedimentation may occur. This is not deleterious but on such an occurance, the aged concentrate should be preferably agitated prior to use.

The soil treating emulsion may be prepared from the above described concentrate by merely mixing 1 part by volume of the concentrate with 3 parts by volume of water in a container equipped with a good agitator or circulating pump. The emulsion thus produced is free flowing being similar to water in its fluidity.

The following example is illustrative of the preferred composition of the soil-poison concentrate of this invention and its ease of application and outstanding utility, all parts are by weight unless otherwise specified:

About 1.0 parts of the condensation product of 1 part of tall oil and between 1.9 to 2.1 parts of ethylene oxide was mixed with about 0.75 parts of dodecyl benzene sodium monosulfonate. To this mixture was added about 17 parts of toluene and about 3.5 parts of isopropyl alcohol with stirring until solution was complete. In a separate container about 34.0 parts of a chlorinated biphenyl containing about 42% by weight of combined chlorine and about 34.0 parts by weight of trichlorobenzene were intimately mixed and heated to about 55 to 60° C. To this solution was added 10.00 parts of pentachlorophenol and the mixture was stirred until solution was complete. To this solution was then added the solution containing the emulsifying and wetting agents previously prepared.

1 gallon of this soil-poison concentrate was then added to 3 gallons of water in a metal container equipped with a vigorous agitator and stirred until a substantially permanent soil treating emulsion was formed.

The efficacy of the above prepared soil treating emulsion was demonstrated by embedding a 2" x 4" x 18" yellow pine post in termite infested soil to which has been added approximately 1 gallon of the soil treating emulsion per 1 cubic foot of soil. After 1 year in this soil, the yellow pine post was removed and was found to be substantially free from any signs of decay or termite attack. A similar post embedded in similarly termite infested soil but which had not been previously treated with the above mentioned soil treating emulsion, was almost completely destroyed after 2 months in the soil.

What is claimed is:

1. A water emulsifiable soil poison concentrate comprising from 25 to 45 parts by weight of a chlorinated biphenyl having a chlorine content of from 15 to 54 per cent by weight, 25 to 45 parts by weight of trichlorobenzene, 7 to 13 parts by weight of pentachlorophenol, 2.5 to 4.5 parts by weight of isopropyl alcohol, 10 to 20 parts by weight of an aromatic oil boiling between 170° F. and 570° F., 0.5 to 1.5 parts by weight of the non-resinous condensation product of 1 part of a substance selected from the group consisting of abietic acid, abietic anhydride, isomers of abietic acid, salts of abietic acid, esters of abietic acid, resin acids, rosin, rosin oil and tall oil with at least 0.5 part and less than 5 parts by weight of ethylene oxide, and 0.25 to 1.25 parts by weight of a surface-active agent selected from the group consisting of aromatic oil soluble organic sulfates and sulfonates having a Draves wetting time of 10.5 seconds or less in a 0.5 per cent aqueous solution.

2. A water emulsifiable soil poison concentrate comprising about 34.0 parts by weight of a chlorinated biphenyl containing about 42% by weight of chlorine, about 34.0 parts by weight of trichlorobenzene, about 10.0 parts by weight of pentachlorophenol, about 3.5 parts by weight of isopropyl alcohol, about 17 parts by weight of toluene, about 1.0 part by weight of the condensation product of 1 part of tall oil and between 1.9 to 2.1 parts of ethylene oxide, and about 0.75 parts of dodecyl benzene sodium monosulfonate

PAUL GEORGE BENIGNUS.

REFERENCES CITED

The following references are of record in the file of this patent:

UNITED STATES PATENTS

| Number | Name | Date |
|---|---|---|
| 1,970,578 | Schoeller et al. | Aug. 21, 1934 |
| 2,469,493 | Barker | May 10, 1949 |

OTHER REFERENCES

Fellton, J. Econ. Ent., vol. 34, No. 2, pp. 192–194, April 1941.

Carswell et al., Ind. and Engr. Chem., vol. 31, No. 11, pp. 1431–1435, November 1939.

Cupples, U. S. D. A. Div. of Insecticide Investigations Bull. E-504, entitled "A List of Commercially Available Detergents, Wetting, Dispersing, and Emulsifying Agents," June 1940, page 43.

Jones et al., J. Econ. Ent., vol. 39, No. 6, December 1946, pp. 735–740.

Goodhue, J. Econ. Ent., vol. 35, pp. 553–536, 1942.